(12) United States Patent
Chamberlin

(10) Patent No.: US 6,688,617 B2
(45) Date of Patent: Feb. 10, 2004

(54) POSITIVE SHIM LOCKING SYSTEM FOR SUSPENSION ADJUSTMENT DEVICE

(75) Inventor: Michael A. Chamberlin, Richland, MI (US)

(73) Assignee: Dana Corporation, Toledo, OH (US)

( * ) Notice: Subject to any disclaimer, the term of this patent is extended or adjusted under 35 U.S.C. 154(b) by 89 days.

(21) Appl. No.: 10/008,969

(22) Filed: Dec. 7, 2001

(65) Prior Publication Data

US 2003/0146590 A1 Aug. 7, 2003

(51) Int. Cl.$^7$ .............................. B62D 17/00; B60G 7/02
(52) U.S. Cl. .............................. 280/86.753; 280/86.751
(58) Field of Search ........................ 280/86.75, 86.751, 280/86.752, 86.753, 86.754, 86.757; 52/126.1; 248/188.2; 384/626; 16/DIG. 39

(56) References Cited

U.S. PATENT DOCUMENTS

| | | | |
|---|---|---|---|
| 2,299,087 A | 10/1942 | Goetz | 280/124 |
| 2,772,596 A | 12/1956 | Trussell | 85/50 |
| 2,978,253 A | * 4/1961 | Weiss et al. | 280/86.753 |
| 3,526,413 A | 9/1970 | Muller | 280/96.2 |
| 3,880,444 A | 4/1975 | Bridges | 280/96.2 B |
| 3,917,308 A | 11/1975 | Schulz | 280/124 B |
| 4,059,192 A | * 11/1977 | Larsen | 213/61 |
| 4,194,760 A | * 3/1980 | Shiomi et al. | 280/86.753 |
| 4,267,896 A | 5/1981 | Hendriksen | 180/73 R |
| 4,424,984 A | 1/1984 | Shiratori et al. | 280/661 |
| 4,466,635 A | * 8/1984 | Okada et al. | 280/86.753 |
| 4,577,534 A | 3/1986 | Rayne | 81/484 |
| 4,706,987 A | 11/1987 | Pettibone et al. | 280/661 |
| 4,733,884 A | 3/1988 | Pettibone et al. | 280/661 |
| 4,736,964 A | 4/1988 | Specktor | 280/661 |
| 4,869,527 A | 9/1989 | Coddens | 280/663 |
| RE33,179 E | 3/1990 | Pettibone | 280/661 |
| 4,991,868 A | 2/1991 | VanDenberg | |
| 5,052,711 A | 10/1991 | Pirkey et al. | 280/661 |
| 5,388,057 A | 2/1995 | January | |
| 5,538,274 A | * 7/1996 | Schmitz et al. | 280/124.142 |
| 5,640,813 A | 6/1997 | Glazik et al. | |
| 5,960,571 A | * 10/1999 | Perry et al. | 37/411 |
| 5,992,863 A | * 11/1999 | Forbes-Robinson et al. | 280/86.751 |
| 6,027,129 A | 2/2000 | Kleinschmit et al. | 280/86.754 |
| D423,909 S | * 5/2000 | Hartin | D8/349 |

FOREIGN PATENT DOCUMENTS

| | | |
|---|---|---|
| DE | 19613913 A1 | 4/1996 |
| EP | 0486816 A1 | 10/1991 |
| FR | 2702440 A1 | 3/1993 |

OTHER PUBLICATIONS

Automotive Technology, A Systems Approach, 3$^{rd}$ Edition by Jack Erjavec, Delmar Publishing, 99–21134 CIP, Section 7, pp. 1124–1127; 1999.
Auto Mechanics Fundamentals, by Martin W. Stockel and Martin T. Stockel, The Goodheart–Willcox Company, Inc. Publishers, 1982, p. 378.
Application No. 10/007,965, filed Dec. 7, 2001, entitled "Suspension Camber and Caster Adjustment System" and Drawings.

* cited by examiner

*Primary Examiner*—David R. Dunn
(74) *Attorney, Agent, or Firm*—Dykema Gossett PLLC

(57) ABSTRACT

A device for adjusting the position of suspension control arm and, consequently, wheel caster is provided. The device includes a fastener that couples a suspension control arm between a pair of support members in a vehicle frame. Shim packs are supported on the fastener on either side of the control arm between the control arm and the frame support members. The shim packs include shims having open-ended slots for easy addition or removal. Each shim pack may further include a pair of ring shaped members disposed about the fastener, and coupled to the shims of its respective shim pack. The shims are held together using a coupling element such as a cotter pin, however, to prevent the shims from becoming dislodged. The position of the control arm may be adjusted by swapping shims between the first and second shim packs.

18 Claims, 1 Drawing Sheet

US 6,688,617 B2

POSITIVE SHIM LOCKING SYSTEM FOR SUSPENSION ADJUSTMENT DEVICE

FIELD OF THE INVENTION

This invention relates to a vehicle suspension adjustment device, and in particular, to a positive shim locking system used in a vehicle suspension adjustment device.

DISCLOSURE OF RELATED ART

Conventional vehicle suspensions may include shims, or spacers, to adjust the position of a suspension control arm to control wheel camber and/or caster. One conventional system for adjusting wheel camber and wheel caster includes a pivot shaft that extends in a fore/aft direction of the vehicle between two branches of a control arm. Two mounting bolts extend through a pair of support members of the vehicle frame and through the pivot shaft along transverse axes perpendicular to the longitudinal axis of the shaft. Shims are disposed on each bolt between the pivot shaft and support members. Adding or removing shims on either bolt enables adjustment of wheel caster. Adding or removing equal numbers of shims from both bolts enables adjustment of wheel camber.

Although this adjustment system enables adjustment of both wheel camber and caster, the system suffers from several disadvantages. First, caster adjustment also results in adjustment of camber (i.e., the adjustment is not independent). Second, the addition or removal of shims requires storage and maintenance of the shims. Finally, the system requires a relatively large amount of time to make desired adjustments because the mounting bolts must be removed to add or remove the shims. Some inventive systems have attempted to overcome this difficulty by using shims with open-ended slots. The shims in these systems, however, frequently work lose during operation of the vehicle becoming unseated from the mounting bolts and/or misaligned relative to one another.

There is thus a need for a suspension adjustment device that will minimize or eliminate one or more of the above-mentioned deficiencies.

SUMMARY OF THE INVENTION

The present invention provides an improved suspension adjustment device.

A suspension adjustment device in accordance with the present invention includes a fastener disposed about a longitudinal axis. The fastener extends through a pair of support members of a vehicle frame, and a suspension control arm. The inventive system further includes a shim pack disposed between one support member and the control arm. The shim pack includes a shim having an open-ended slot configured to receive the fastener. The shim pack further includes another shim coupled to the open-ended shim. The shim pack may further include a pair of ring shaped members disposed about the fastener, and coupled to the shims. The addition or removal of coupled shims adjusts the position of the suspension control arm relative to the vehicle frame. The inventive system may further include a second shim pack disposed between the other support member and the control arm. Adjustment of the control arm position may be made by swapping shims between the shim packs.

A suspension adjustment device in accordance with the present invention has several advantages as compared to conventional systems. The inventive device allows wheel caster adjustment independently from wheel camber adjustment. The inventive device allows much faster and less cumbersome adjustment of wheel caster while preventing the shims from working loose and/or becoming dislodged. Additionally, the shims in the inventive device stay locked regardless of the position set for camber or caster. Finally, when two shim packs are used on opposite sides of the control arm, all the shims needed for adjustment may be found within the inventive device as adjustments may be made by swapping shims between the first and second shim packs.

These and other features and objects of this invention will become apparent to one skilled in the art from the following detailed description and the accompanying drawing illustrating features of this invention by way of example.

DETAILED DESCRIPTION OF THE PREFERRED EMBODIMENT

Figure 1:
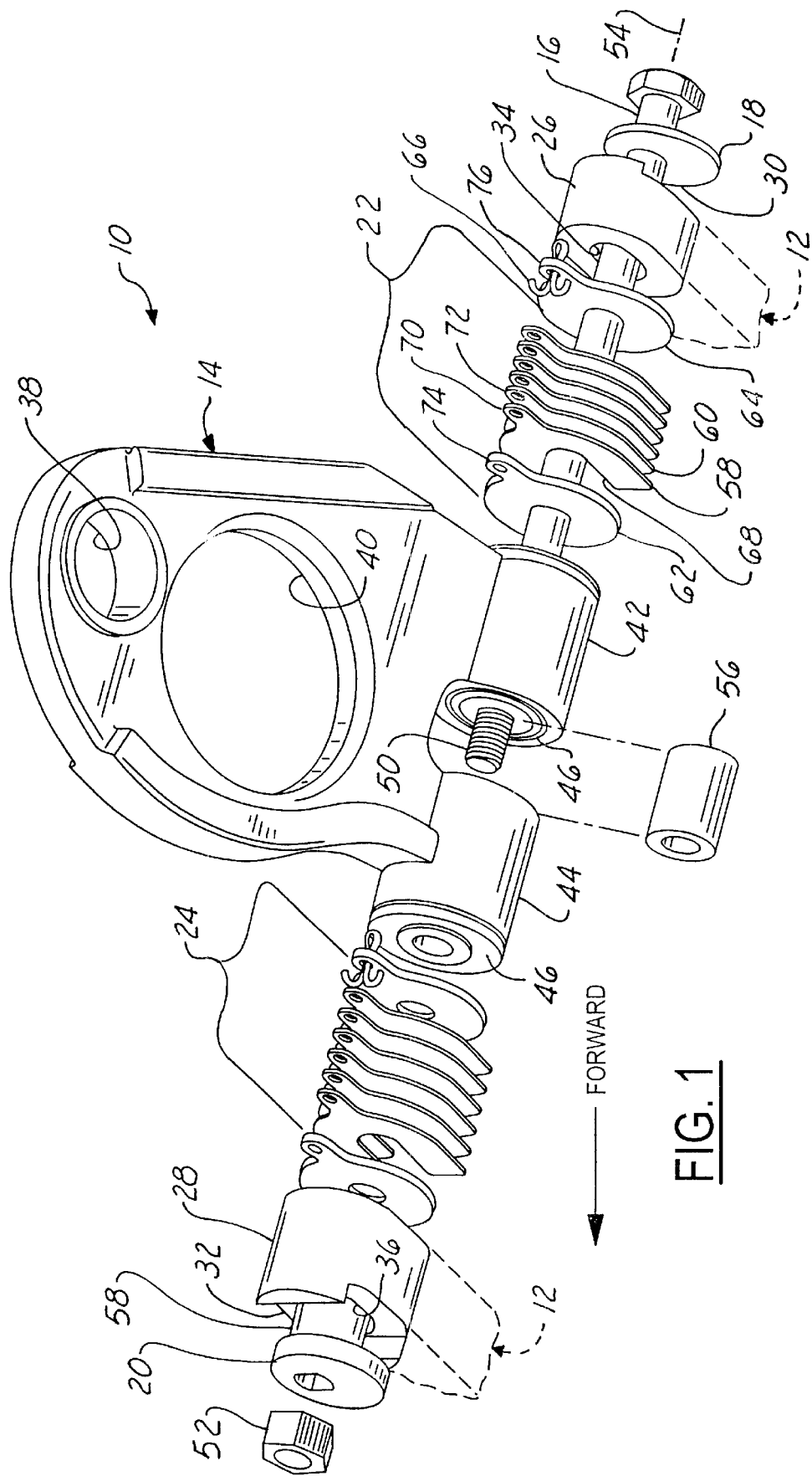
FIG. 1 is an exploded perspective view of a suspension adjustment device in accordance with the present invention.

Referring now to the drawing, FIG. 1 illustrates a suspension adjustment device 10 in accordance with the present invention. Device 10 is provided to adjust the position, relative to vehicle frame 12, of a suspension control arm 14 in order to adjust wheel caster. Device 10 is configured for use in an independent front wheel suspension assembly of a vehicle. It should be understood, however, that device 10 may find use in conventional front and rear wheel suspensions, and in a variety of vehicles including automobiles and trucks. It should be further understood that device 10 may be employed in suspension assemblies as part of a suspension adjustment device used to adjust both wheel camber and wheel caster. Finally, it should be understood that device 10 may be used to adjust the position of other structural elements and is not limited to use in adjusting vehicle suspensions. As discussed in greater detail hereinbelow, device 10 includes a fastener 16 and may also include cams 18, 20. In accordance with the present invention, device 10 includes a shim pack 22 and may also include a shim pack 24.

Vehicle frame 12 provides a rigid structural foundation for the vehicle body (not shown), and an anchorage support for the vehicle suspension system. Vehicle frame 12 may be constructed of steel members, or any similar material that will provide a rigid support. Vehicle frame 12 may also be a sub-frame or component of an overall vehicle frame. It should be understood, however, that material composition and method of manufacture of vehicle frame 12 may be varied without departing from the spirit of the present invention.

Vehicle frame 12 may include a pair of support members 26, 28. Support members 26, 28 may be spaced apart to receive a control arm 14. Support member 26 may have a groove 30 configured to receive cam 18. Similarly, support member 28 may have a groove 32 configured to receive a cam 20. Grooves 30, 32 may be milled into support members, 26, 28 respectively, and may have a constant width.

Support members 26, 28 also define elongated slots 34, 36, respectively, configured to receive fastener 16. Slots 34, 36 are in communication with grooves 26, 28, respectively. Slots 34, 36 are elongated in a transverse direction relative to the longitudinal direction of fastener 16 and slots 34, 36 have a minor axis about equal to the diameter of fastener 16.

Control arm 14 is provided as a component of an independent front suspension used to control vehicle wheels relative to the vehicle frame, and can help dampen vibrations when rubber mounted. Control arm 14 can be used to adjust the position of the wheel relative to the vehicle. Control arm 14 may be an upper control arm or a lower control arm of a suspension system. In the illustrated embodiment, control arm 14 is an upper control arm. Control arm 14 includes an aperture 38 for supporting a steering knuckle (not shown) on which a vehicle wheel is disposed. Control arm 14 includes another aperture 40 configured to allow a spring/shock unit (not shown) to extend therethrough. Control arm 14 further adjusts the position of a vehicle wheel (not shown) relative to the vehicle. Control arm 14 is conventional in the art and may be made from steel or other conventional metals or metal alloys.

Control arm 14 may be bifurcated and include branches 42, 44. Disposed within branches 42, 44 are bushings 46. Bushings 46 are provided to radially support branches 42, 44 of support control arm 14 about fastener 16. Bushings 46 are conventional in the art, and may include an inner sleeve, a mid-portion, and an outer sleeve. The inner and outer sleeves may be made of steel other conventional metals or metal alloys. The mid-portion may be made of, for example, rubber or polyurethane. The mid-portion and outer sleeve may be provided with flanges which allow bushings 46 to receive loads axially in addition to receiving radial loads.

Fastener 16 is provided to attach control arm 14 to vehicle frame 12 and provide a structure upon which control arm 14 can pivot, relative to vehicle frame 14. Fastener 16 is conventional in the art, and may be a bolt having a head 48 and a threaded end 50 for receiving a nut 52. It should be understood, however, that fastener 16 may alternatively comprise a screw, pin, threaded shaft, or other conventional fastener. Fastener 16 is disposed about a longitudinal axis 54. Fastener 16 may have a flat side which extends parallel to longitudinal axis 54. Fastener 16 extends through slot groove 30 and slot 34 of support member 26, bushings 46 branches 42, 44, and slot 36 and groove 32 of support member 28. A fixed spacing member 56 may be disposed about fastener 16 between branches 42, 44 of control arm 14. Fixed spacing member 56 receives axial loads along fastener 16 and maintains a constant distance between bushings 46 in branches 42, 44. Fixed spacing member 56 may be made of conventional metals or metal alloys.

Although a single fastener is used in the illustrated embodiment, it will be appreciated by those skilled in the art separate fasteners may be used to couple branches 42, 44 of control arm 14 to support members 26, 28, respectively.

Cams 18, 20 are provided to enable rotation and positioning of fastener 16 within slots 34, 36 of support members 26, 28, respectively. Cams 18, 20 are disposed about fastener 16 and within grooves 30, 32, respectively. Cams 18, 20 may be generally circular, and captive within grooves 30, 32, respectively. The diameters of cams 18, 20 are slightly less than the width of grooves 30, 32, so that cams 18, 20 are free to rotate within grooves 30, 32. Cams 18, 20 each further have eccentrically positioned D-shaped holes configured to receive fastener 16. The flat side of each D-shaped hole is provided to engage the flat side of fastener 16.

Cam 20 is provided with an extension 58 that extends longitudinally through slot 36 of support member 28. When fastener 16 is secured, cam 20 floats within groove 32 of support member 28. In contrast, cam 18 is clamped to support member 26 when fastener 16 is secured. Extension 58 is provided to allow for adjustment of the position of cam 20 in the fore-aft direction within groove 32 to adjust for dimensional tolerances of the components in device 10.

Rotation of cams 18, 20 adjusts the position of fastener 16 along the widths, i.e., transverse axes, of slots 34, 36. Such adjustment of fastener 16 necessarily adjusts the position of control arm 14, through which fastener 16 passes, along a transverse axis perpendicular to the longitudinal axis 54 of fastener 16. This adjustment adjusts the camber of the wheel associated with control arm 14.

Shim packs 22, 24 are provided to adjust the position of control arm 14 relative to vehicle support frame 12, along the longitudinal axis 54 of fastener 16; i.e., adjusting the caster of the wheel associated with control arm 14. Shim pack 22 is disposed about fastener 16 between support member 26 of vehicle frame 12 and branch 42 of control arm 14. Shim pack 24 is disposed about fastener 16 between support member 28 of vehicle frame 12 and branch 44 of control arm 14. Each of shim packs 22, 24 may include a plurality of shims such as shims 58, 60, members 62, 64, and coupling element 66.

Shims 58, 60 are provided to adjust the position of control arm 14 relative to frame 12 along axis 54. Shims 58, 60 may be made out of metals, metal alloys, or plastic and may be stamped, forged, or molded from such material. Each of shims 58, 60 may be generally U-shaped defining, in accordance with the present invention, an open-ended slot 68 which itself may be U-shaped. It will be appreciated by those skilled in the art, however, that the shape of shims 58, 60 and slot 68 may be varied without departing from the spirit of the present invention. Slot 68 is configured to receive fastener 16 and allows shim to be slid onto and off of fastener 16 without the removal of fastener 16. Shims 58, 60 may further have aligned tabs 70, 72 extending therefrom respectively, which include apertures configured to receive coupling element 66. In the illustrated embodiment, each of shim packs 22, 24, includes five shims. It should be understood, however, that the number of shims in each of packs 22, 24 may be varied (and may vary from one another) without departing from the spirit of the present invention.

Ring members 62, 64 are disposed at either end of the shims in each shim pack 22, 24. Ring members 62, 64 may be made out of conventional metals, metal alloys, or plastic. Ring members 62, 64 are annular in shape and are completely disposed about fastener 16. Ring members 62, 64 may further have aligned tabs 74, 76 extending therefrom respectively, which include apertures configured to receive coupling element 66 to secure ring members 62, 64 to shims 58, 60. Tabs 74, 76, and the apertures therein, may be aligned with tabs 68, 70, and the apertures therein, of shims 58, 60.

Coupling element 66 is provided to secure shims 58, 60, and ring members 62, 64 together in each of shim packs 22, 24 and to prevent shims 58, 60 from becoming misaligned or unseated from fastener 16. Element 66 is preferably a removable fastener, and may comprise a cotter pin as shown in FIG. 1. It will be appreciated by those skilled in the art, however, that other coupling elements, including bolts, pins, and screws, could be used in place of the cotter pin.

The position of control arm 14, relative to vehicle frame 12, along axis 54 (i.e., in the fore-aft direction of the vehicle) may be adjusted by adding or subtracting additional shims to or from either of shim packs 22, 24. Preferably, however, the position of control arm 14 is adjusted by swapping shims between shim packs 22, 24.

A suspension adjustment device in accordance with the present invention represents a significant improvement as compared to conventional suspension adjustment device. The inventive system allows much faster and less cumbersome adjustment of caster, because the shims 58, 60 include open-ended slots that allow the shims to be slid onto and off of fastener 16 rather than requiring the removal of fastener 16. Misalignment or unseating of shims 58, 60 is prevented, however, because shims 58, 60 are coupled together using coupling element 66. Further, if two shim packs are used on opposite sides of the control arm, all of the shims needed for adjustment may be found within the device and there is no need to store and maintain shims for use with the device.

While the invention has been particularly shown and described with reference to the preferred embodiments thereof, it is well understood by those skilled in the art that various changes and modifications can be made in the invention without departing from the spirit and scope of the invention.

I claim:

1. A device for adjusting the position of an element, comprising:
    first and second ring shaped members disposed at one end of said element and configured to receive a fastener extending through said element;
    a first shim disposed between said first and second members, said first shim including an open-ended slot configured to receive said fastener;
    a second shim disposed between said first and second members; and,
    a coupling element extending through said first and second ring shaped members and said first and second shims.

2. The device of claim 1, wherein said first and second shims include aligned tabs through which said coupling element extends.

3. The device of claim 1, wherein said slot is generally U-shaped.

4. The device of claim 1, wherein said coupling element comprises a cotter pin.

5. A suspension adjustment device, comprising:
    a fastener disposed about a longitudinal axis and extending through a support member of a vehicle frame and a suspension control arm: and,
    a shim pack disposed between said support member and said suspension control arm, said shim pack including:
        a first shim having an open-ended slot configured to receive said fastener: and
        a second shim coupled to said first shim, wherein said shim pack further includes first and second ring shaped members, said first and second shims coupled to said first and second ring shaped members.

6. The suspension adjustment device of claim 5 wherein said first and second ring shaped members and said first and second shims have aligned tabs extending therefrom, said aligned tabs configured to receive a coupling element.

7. The suspension adjustment device of claim 6 wherein said coupling element comprises a cotter pin.

8. The suspension adjustment device of claim 5 wherein said first and second shims are disposed between said first and second ring shaped members.

9. The suspension adjustment device of claim 5 wherein said slot is generally U-shaped.

10. The suspension adjustment device of claim 5 wherein said first shim is generally U-shaped.

11. The suspension adjustment device of claim 5 wherein said first and second shims include aligned tabs extending therefrom, said aligned tabs configured to receive a coupling element.

12. The suspension adjustment device of claim 11 wherein said coupling element comprises a cotter pin.

13. A suspension adjustment device, comprising:
    a fastener disposed about a longitudinal axis and extending through a first support member of a vehicle frame, a suspension control arm, and a second support member of said vehicle frame;
    a first shim pack disposed between said first support member and said suspension control arm; and,
    a second shim pack disposed between said second support member and said suspension control arm
    wherein each of said first and second shim packs includes a first shim having an open ended slot configured to receive said fastener,
    wherein said first shim pack further includes first and second ring shaped members, said first shim coupled to said first and second ring shaped members.

14. The suspension adjustment device of claim 13 wherein said first and second ring shaped members and said first shim have aligned tabs extending therefrom, said aligned tabs configured to receive a coupling element.

15. The suspension adjustment device of claim 13 wherein said first shim is disposed between said first and second ring shaped members.

16. The suspension adjustment device of claim 13 wherein said slots are generally U-shaped.

17. The suspension adjustment device of claim 13 wherein said first pack includes a second shim coupled to said first shim.

18. The suspension adjustment device of claim 17 wherein said first and second shims of said first shim pack include aligned tabs extending therefrom, said aligned tabs configured to receive a coupling element.

* * * * *